De L. Cole,
Extension Table.
No. 77,801.   Patented May 12, 1868.
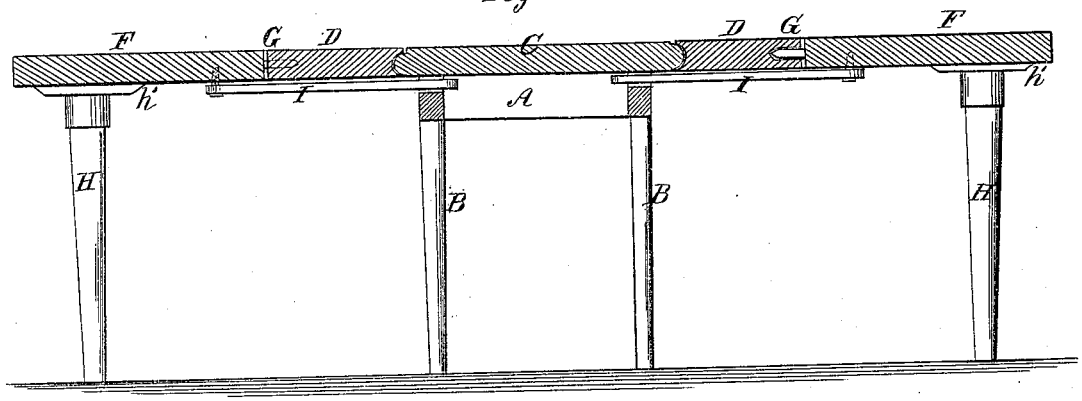
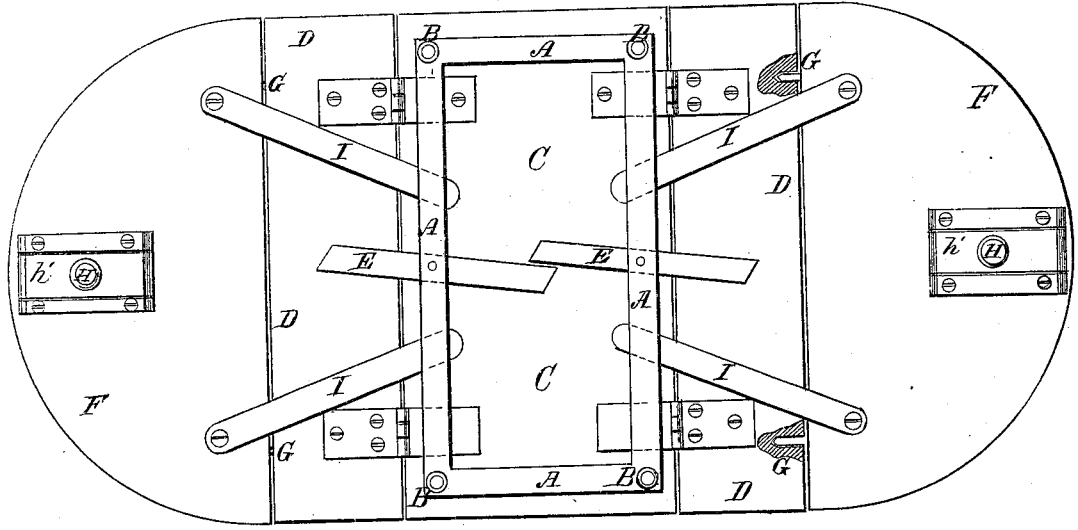
Witnesses.
W. C. Ashkettle
Wm A Morgan
Inventor.
De Lance Cole
per Murray
Attorneys

United States Patent Office.

DE LANCE COLE, OF MARSHALL, ILLINOIS.

Letters Patent No. 77,801, dated May 12, 1868.

IMPROVED EXTENSION FOR TABLES.

*The Schedule referred to in these Letters Patent and making part of the same.*

TO ALL WHOM IT MAY CONCERN:

Be it known that I, DE LANCE COLE, of Marshall, in the county of Clark, and State of Illinois, have invented a new and useful Improvement in Extension-Tables; and I do hereby declare that the following is a full, clear, and exact description thereof, which will enable others skilled in the art to make and use the same, reference being had to the accompanying drawings, forming part of this specification.

Figure 1 is a vertical longitudinal section of my improved table.

Figure 2 is an under side view of the same.

Similar letters of reference indicate corresponding parts.

My invention has for its object to furnish a simple, inexpensive, convenient, and substantial means for enlarging or extending an ordinary breakfast or dining-table to any desired size or extent; and it consists in connecting the extension-leaves to the table by means of supporting-bars and dowel-pins, and in making the leg of the extension-leaf detachable; the whole being constructed and arranged as hereinafter more fully described.

A is the frame, to which the legs B and stationary leaf C are attached in the ordinary manner.

D are the side or drop leaves, the edges of which are hinged to the side edges of the stationary leaf C in the usual manner, and which are supported, when raised into a horizontal position, by the bars E sliding in or pivoted to the frame A in the ordinary manner.

F is an extension-leaf, the inner edge of which is furnished with dowel-pins G, which enter holes in the edge of the hinged leaf D, so as to keep the adjacent edges of the said leaves in their proper relative positions, at the same time that they assist in supporting the inner edge of the said leaf. The outer part of the leaf F is supported upon a leg, H, which may be permanently or removably attached to said leaf.

I prefer to form the leg H with a dove-tailed cap, h', formed upon or attached to its upper end, which enters a dove-tailed groove upon the under side of the leaf F, so as to substantially and at the same time detachably connect the said leg to the side leaf. This construction enables the leg to be easily detached from the leaf when desired for convenience in storage.

I are bars, the outer ends of which are attached securely to the under side of the leaf F, and which are of such a length as to reach to and enter slots in the side-bars of the frame A, as shown in figs. 1 and 2, so as to firmly sustain the said extension-leaf F.

The outer ends of the bars I may be rigidly attached to the leaf F, or they may be pivoted to the said leaf. This latter construction I prefer, as it enables the said bars to be turned down along the under side of said leaf for convenience in storage when not required for use.

One or any desired number of leaves, F, may be used, and they may be made rectangular, or may have their outer edges rounded off, as may be desired.

I claim as new, and desire to secure by Letters Patent—

The combination of the extension-leaf or leaves F, provided with legs H, dowel-pins G, and supporting-bars I, with the hinged leaf or leaves D and slotted side-bars of the frame A of an ordinary table, substantially as herein shown and described and for the purpose set forth.

DE LANCE COLE.

Witnesses:
FRANKLIN MARK,
SAMUEL JENNINGS.